(12) United States Patent
Bates et al.

(10) Patent No.: US 6,378,124 B1
(45) Date of Patent: Apr. 23, 2002

(54) DEBUGGER THREAD SYNCHRONIZATION CONTROL POINTS

(75) Inventors: Cary Lee Bates, Rochester; Jeffrey Michael Ryan, Byron, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/253,787

(22) Filed: Feb. 22, 1999

(51) Int. Cl.[7] .................................................. G06F 9/45
(52) U.S. Cl. ...................... 717/4; 717/3; 717/5; 717/8; 717/11; 714/707
(58) Field of Search ............................. 717/4, 3, 8, 5, 717/11; 714/707

(56) References Cited

U.S. PATENT DOCUMENTS

| | | | |
|---|---|---|---|
| 5,142,679 A | 8/1992 | Owaki et al. | 395/700 |
| 5,297,274 A | 3/1994 | Jackson | 395/500 |
| 5,375,125 A | 12/1994 | Oshima et al. | 371/19 |
| 5,438,574 A | 8/1995 | Taniguchi | 395/183.14 |
| 5,632,032 A | 5/1997 | Ault et al. | 395/670 |
| 5,687,375 A | 11/1997 | Schwiegelshohn | 395/704 |
| 5,943,498 A | 8/1999 | Yano et al. | 395/704 |
| 5,953,530 A | * 9/1999 | Rishi et al. | 717/4 |
| 5,978,937 A | 11/1999 | Miyamori et al. | 714/45 |
| 6,009,269 A | 12/1999 | Burrows et al. | 395/704 |

(List continued on next page.)

OTHER PUBLICATIONS

Savage, "Eraser: A Dynamic Data Race Detector for Multithreaded Programs", ACM Transactions on Computer Systems, pp. 391–411, Nov. 1997.*

Xu et al., "Dynamic Instrumentation of Threaded Applications", ACM, pp. 49–59, 1999.*

"The Kernel Kit: Semaphores", http://www.sie.co.jp/HTML/KernelKit/sems.html; downloaded Dec. 14, 1998, pp. 1–9.

Ramsey, "Correctness of Trap–Based Breakpoint Implementations", ACM, pp. 25–24, Jan. 1994.

Buhr et al., "KDB: a multi–threaded debugger for multi–threaded applications", ACM, pp. 80–87, May 1996.

Koch et al., "Breakpoints and Breakpoint Detection in Source Level Emulation", IEEE, pp. 26–31, Nov. 1996.

L. Pitt, Probabilistic inductive inference, ACM, pp. 383–433, Apr. 1989.

Aral et al., "High–level debugging in parasight", *Proceedings of the ACM SIGPLAN and SIGOPS Workshop on Parallel and distributed debugging*, pp. 151–162, May 1998.

Kessler, "Fast Breakpoints: Design and Implementation", ACM, pp. 78–84, Jun. 1990.

Toledo et al., "Quantitative Performance Modeling of Scientific Computations and Creating Locality in Numerical Algorithms", Massachusetts Institute of Technology, http://www.lcs.mit.edu/, pp. 1–153, Jun. 1995.

Rosenberg, Jonathan B., *How Debuggers Work Algorithms, Data Structures and Architecture*, New York: Wiley Computer Publishing, (1996), pp. 95–133.

Primary Examiner—Kakali Chaki
Assistant Examiner—Ted T. Vo
(74) Attorney, Agent, or Firm—Wood, Herron & Evans

(57) ABSTRACT

A computer system, program product and method utilize thread synchronization for debugging multi-threaded computer programs. Synchronization control points ("sync points") are used to conditionally suspend or delay execution of a thread or threads depending on another thread or threads hitting the same or other sync points. A thread hitting a synchronization control point is suspended, reference is made to break point table to determine what synchronization condition must be triggered to release the thread, and if triggered, what delay, if any, will be imposed prior to release.

17 Claims, 6 Drawing Sheets

U.S. PATENT DOCUMENTS

| | | | |
|---|---|---|---|
| 6,126,328 A | 10/2000 | Mallory et al. | 395/704 |
| 6,148,381 A | 11/2000 | Jotwani | 711/158 |
| 6,202,199 B1 | 3/2001 | Wygodny et al. | 717/4 |
| 6,216,237 B1 | 4/2001 | Klemm et al. | 714/38 |
| 6,256,755 B1 | 7/2001 | Hook et al. | 714/718 |
| 6,256,775 B1 | 7/2001 | Flynn | 717/4 |
| 6,282,701 B1 | 8/2001 | Wygodny et al. | 717/4 |

* cited by examiner

DEBUGGER THREAD SYNCHRONIZATION CONTROL POINTS

FIELD OF THE INVENTION

The invention is generally related to computers and computer software. More specifically, the invention is generally related to debugging multi-threaded software.

BACKGROUND OF THE INVENTION

Locating, analyzing and correcting suspected faults in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one, and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, a second operation supported by conventional debuggers is a break point operation, which permits a computer programmer to identify with a "break point" a precise instruction for which it is desired to halt execution of a computer program during execution. As a result, when a computer program is executed by a debugger, the program executes in a normal fashion until a break point is reached, and then stops execution and displays the results of the computer program to the programmer for analysis.

Typically, step operations and break points are used together to simplify the debugging process. Specifically, a common debugging operation is to set a break point at the beginning of a desired set of instructions to be analyzed, and then begin executing the program. Once the break point is reached, the program is halted, and the programmer then steps through the desired set of instructions line by line using the step operation. Consequently, a programmer is able to quickly isolate and analyze a particular set of instructions without having to step through irrelevant portions of a computer program.

Most break points supported by conventional debuggers are unconditional, meaning that once such a break point is reached, execution of the program is always halted. Some debuggers also support the use of conditional break points, which only halt execution of a program when a variable used by the program is set to a predetermined value at the time such a break point is reached.

Some operating systems, such as UNIX and Windows NT, allow multiple parts, or threads, of one or more processes to run simultaneously. These operating systems are referred to as multi-threaded. This type of parallel processing allows for faster execution of such processes on multi processor machines, and can simplify software development.

Synchronization of multi-threaded computer programs is typically provided by semaphores. A semaphore is a token that is used in a multi-threaded operating system to coordinate access, by competing threads, to "protected" resources or operations. This coordination may be used to limit the number of threads that can execute a piece of code at the same time. The typical limit is one, creating a mutually exclusive lock. Semaphores are also used to impose the order in which a series of interdependent operations are performed. Thus, a semaphore acts as a key that a thread must acquire to continue execution. Any thread that can identify a particular semaphore can attempt to acquire it by passing to the semaphore function a system-wide number that is assigned when the semaphore is created. The function does not return until the semaphore is actually acquired. Alternatively, a semaphore may specify a time limit after which the semaphore is released.

The term semaphore generally refers to a function used to halt execution of a section of code until a condition is satisfied releasing the semaphore function. The term mutex is often used interchangeably, although generally a mutex is a broader concept, encompassing the data structures used to track the semaphore function, the evaluation of the condition holding completion of the semaphore function, and scheduling the release of threads queued by the semaphore function.

Debugging multi-threaded computer programs is difficult since timing (i.e., synchronization) problems occur and sometimes may be very difficult to reproduce. For instance, the debugging environment may interfere with the synchronization in the design of the computer program, such as the semaphores present. Many reasons for this interference with the synchronization may be present, such as the computer system upon which the computer program is being debugged is different in performance from the intended ultimate host for the computer program. Also, the debugging environment includes additional monitoring and control over program execution that may necessarily impede the intended execution of threads. Not only do debuggers introduce synchronization problems, but the programmer may be specifically interested in evaluating specific synchronization situations that could possibly occur. However, the programmer does not want to alter the design of the program to force a specific synchronization situation, but rather wants a temporary synchronization debugging method. For example, the programmer may want to evaluate how the computer program would behave when three threads of interest are utilizing sections of code simultaneously.

Another reason why thread synchronization during debugging may be necessary would be when an incomplete computer program is being debugged. Sections or modules of a computer program may merely be represented with "stubs" to exercise the interfaces. However, such stubs would not perform like the fall computer program. For example, a tactical fighter aircraft mission avionics system integrates a large number of displays, navigational aids, communication systems, weapons delivery systems, crew comfort, and other systems. The amount of code required to control these many functions is large, so the software development approach is generally a top-down design with bottom up testing. Thus, each subfunction required to perform these tasks is defined, including the interfaces to other subfunctions. A programmer would then write the lower tier sections of computer program, such as a module. As these lower tier sections are completed, larger amounts of the computer program are debugged and tested. It would be impractical to wait for the entire computer program to be available in order to debug. Often, some functions may be delayed for years after a flyable computer program is required.

Unfortunately, replicating synchronization situations expected in the fall computer program may be difficult to replicate in the incomplete computer program. For example, a stub routine called by the computer program may return a constant value whereas the real routine, when available, would perform a number of calculations and processing steps that would delay such a response. The programmer would like to synchronize execution of a thread executing this stub routine to be more like the expected performance, but does not want to waste time developing elaborate code for the stub that would ultimately be discarded.

One manner of debugging synchronization problems is for a user to set a break point and allow one thread to hit it. The user then suspends the first thread and commands the program to continue executing until a second thread hits the break point. The user then releases the first thread allowing both threads to execute. However, even having manually created the synchronized thread condition of interest, the suspected fault may not manifest itself until many repetitions. Moreover, the number or identity of threads suspected of causing the fault could be numerous, making this manual synchronization impractical.

Therefore, a significant need exists for a controlling the synchronization of threads so that multi-threaded applications can be debugged more readily.

SUMMARY OF THE INVENTION

The invention addresses these and other problems associated with the prior art by providing an apparatus, program product, and method of debugging a multi-threaded computer program that utilize synchronization control points to synchronize thread execution. During execution of a portion of a multi-threaded computer program, a thread is conditionally suspended at a synchronization control point ("sync point") until a synchronization condition is satisfied, such as another thread or threads hitting the same or a different synchronization control point. Moreover, a thread may be further conditionally suspended for a delay period in response to the thread reaching a synchronization control point.

Control points are advantageously used during debugging of the computer program in order to temporarily restrict execution without altering the design of the computer program. Control points are included for reasons other than synchronization, especially break points which typically halt all threads either unconditionally or depending on the state of a variable. Utilizing control points for synchronization affords similar advantages in that the computer program is only temporarily altered and readily restored to its former condition. Moreover, existing hardware typically available in a computer system and software in the debugging environment may be utilized to handle synchronization control points.

Synchronization control points consistent with the invention may also be used to synchronize a number of threads without specifying which threads. The intent may be to burden certain resources of the computer program to detect timing faults, thus the number of threads is forced to execute from certain synchronization control points simultaneously. Each thread that hits one or more associated synchronization control points is held until the requisite number are being held. After which, all are released either immediately or with a predetermined delay scheduled for each thread.

One advantage of the use of thread synchronization control points is that a program being debugged can be tested bottom up, without waiting for all of the code to be available. Normal operation can be emulated with proper synchronization conditions and delays added during debugging. Another advantage is that reproducing software bugs more frequently is made easier. Yet another advantage is that thread synchronization control points could be used to detect infrequent synchronization faults that might not be apparent each time that a condition is created, e.g., an error that occurs every hundredth time that three threads simultaneously execute within a region.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there are described various embodiments of the invention.

BRIER DESCRIPTION OF THE DRAWINGS

DETAILED DESCRIPTION

Debugging multi-threaded computer programs is aided by inserting synchronization control points ("sync points") within the program whereby threads can be conditionally suspended at a synchronization control point as a function of what other threads have been suspended at their respective synchronization control points. Moreover, a thread can be further conditionally suspended with a delay period.

In some embodiments, a mutex is used in combination with one or more synchronization control points. A break point manager evaluates a synchronization control point and initiates or modifies a mutex set to alter thread execution. Furthermore, the synchronization control point may be implemented similarly to other control points generally employed during debugging, such as break points.

The suspension of the thread, whether by a semaphore in the computer program or by synchronization control point inserted into the computer program during debugging, is accomplished in part with a mutex. A semaphore is a function that may be called in a computer program to synchronize execution of a section of code whereas a mutex is herein used to refer to the larger concept of data structures and computer system code used to perform the semaphore function. Threads suspended awaiting a value to be available or for a synchronization condition to be triggered are managed by the mutex. The computer system schedules thread execution in part by referencing the mutex wherein the suspended threads are queued. Releasing the mutex results in the suspended threads being scheduled for release. Additional processing is available at this point to prioritize the scheduled release or to queue a thread behind a timer for later release. Generally for semaphores, the mutex is single function or variable at a specific point in the computer program, and the term mutex may be often used interchangeably with the term semaphore. However, in the present instance, the queuing and scheduling aspects of a mutex is broadened in the debugging environment by associating one or more points in the code, using temporary synchronization control points. Mutexes and break points therefore perform distinctly different functions in controlling program execution during debugging.

Mutexes allow the computer program to continue executing in so far as not all threads may be suspended. Break points are intended to halt execution completely, although break points may be conditionally triggered such as with a variable. One advantage of the present invention is to utilize the advantages of break points inherent in the debugging environment along with the advantages of mutexes generally available in the computer system.

Figure 1:
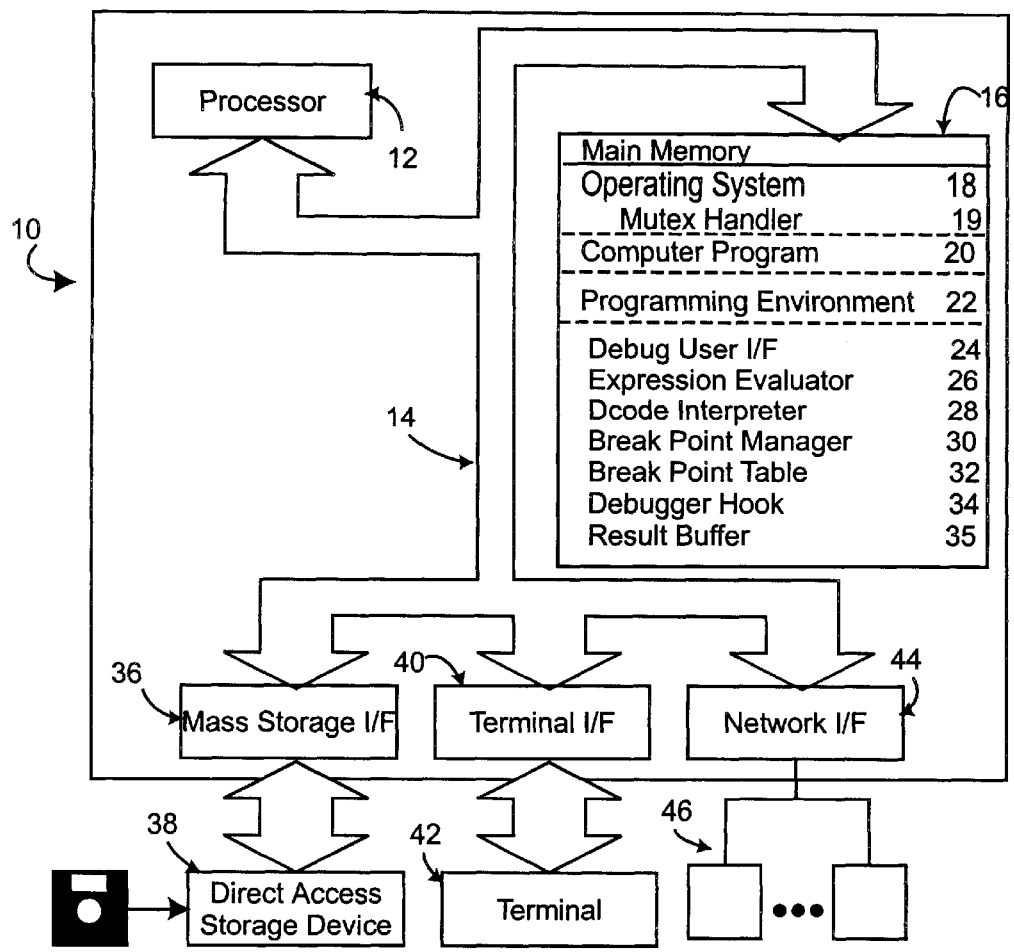
FIG. 1 is a block diagram of a computer system consistent with the invention.

Turning to the Drawings, wherein like numbers denote like parts throughout the several views, FIG. 1 illustrates a computer system 10 consistent with the invention. Computer system 10 is shown for a multi-user programming environment that includes at least one processor 12 which obtains instructions, or op codes, and data via a network 14 from a main memory 16. The processor 12 could be a PC-based server, a minicomputer, a midrange computer, a mainframe computer, etc. The main memory 16 includes an operating system 18, a mutex handler 19, a computer program 20, and a programming environment 22. The programming environment 22 provides a way to debug the computer program 20, or computer code, by providing tools for locating, analyzing and correcting faults. One such tool is thread synchronization. As will be shown below, this thread synchronization tool is provided by the cooperation of a debug user interface 24, expression evaluator 26, code interpreter 28, break point manager 30, break point table 32, debugger hook 34, and result buffer 35. The threads are suspended and released selectively by the break point manager 30 commanding a mutex be set or cleared by the mutex handler 19.

It should be appreciated that the main memory 16 could be one or a combination of memory devices, including Random Access Memory, nonvolatile or backup memory (e.g., programmable or Flash memories, read-only memories, etc.). In addition, memory 16 may be considered to include memory storage physically located elsewhere in computer system 10, e.g., any storage capacity used as virtual memory or stored on a mass storage device or on another computer coupled to computer system 10 via network 14.

The computer system 10 could include a number of operators and peripheral systems as shown for example by a mass storage interface 36 operably connected to a direct access storage device 38, by a terminal interface 40 operably connected to a terminal 42, and by a network interface 44 operably connected to a plurality of networked devices 46. The terminal 42 and networked devices 46 could be desktop or PC-based computers, workstations, or network terminals, or other networked computer systems.

For purposes of the invention, computer system 10 may represent practically any type of computer, computer system or other programmable electronic device, including a client computer, a server computer, a portable computer, an embedded controller, etc. The computer system 10 may be a standalone device or networked into a larger system.

In general, the routines executed to implement the embodiments of the invention, whether implemented as part of an operating system or a specific application, component, program, object, module or sequence of instructions will be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 2:
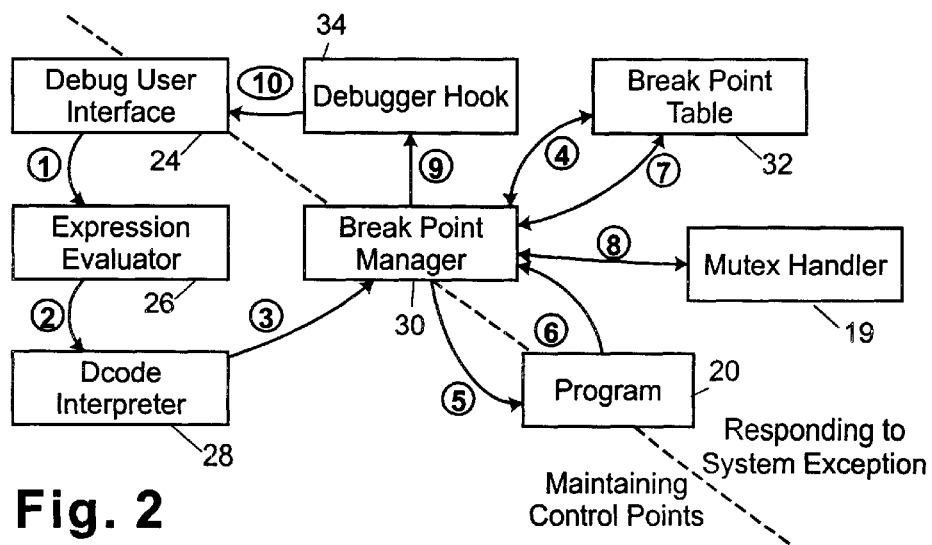
FIG. 2 is a block diagram of an exemplary software environment for the computer system of FIG. 1.

Referring to FIG. 2, an exemplary software environment is shown for the computer system 10 of FIG. 1. Specifically, thread synchronizing capability is illustrated in block diagram form, with the elements shown that contribute to maintaining control points (e.g., creating and deleting) and to responding to a system exception. The debug user interface 24, which may be a third-party debugging program, is shown initiating the process, providing at Phase 1 any control points to be established. For example, a debugger command is made setting a thread synchronizing control point or a break point. In some instances, the user may define these control points by referring to high-order language (HOL) references such as line or statement numbers or software object references such as a program or module name, from which the physical storage address may be cross referenced. The illustrative embodiment described below shows a user providing statement number references from which memory addresses are cross referenced.

At Phase 2, this debugger command is parsed by the expression evaluator 26 that uses a table that was produced by a compiler stored with the computer program 20 to map the line number in the debugger command to the actual physical storage address in memory 16. The code interpreter 28 at Phase 3 passes on the control point information to the break point manager 30, which in turn updates the break point table 32 at Phase 4. At Phase 5, the code interpreter 28 runs a code program to control the break point manager 30 to set the control points.

After the control points are set, user provides an input that resumes execution of the program 20. As represented at Phase 6, execution of the program eventually results in an encounter of a control point. In the illustrative embodiment, this is accomplished by an invalid statement in the program 20 causing a system exception. An interrupt handler, or similar means, passes information regarding the exception or interrupt to the break point manager 30. The break point manager 30 references and updates the break point table 32 at Phase 7 as required in order to determine what type of control point was encountered and the associated processing.

If in Phase 7 a synchronization control point was recognized, then in Phase 8 the break point manager 30 commands the mutex handler 19 to carry out the intent of the synchronization control point. For embodiments in which the synchronization control point halts execution of the multi-threaded computer program, the break point manager 30 also allows program execution to recommence after the mutex handler 19 has suspended the thread hitting the synchronization control point. Phases 6, 7, and 8 may repeat a number of times until program execution is halted by user command or a system break point.

Then, at Phase 9, the break point manager 30 utilizes the debugger hook 34 in order to obtain debugger commands, especially when a break point has halted program execution. The debugger hook 34 prompts the debug user interface 24 at Phase 10. The additional step of the debugger hook 34 is illustrated for instances where an interface is required between the user interface 24 and the other portions of the programming environment 22. The debugger hook 34 utilizes the result buffer 35 to cache data for the debug user interface 24.

Figures 3, 5:
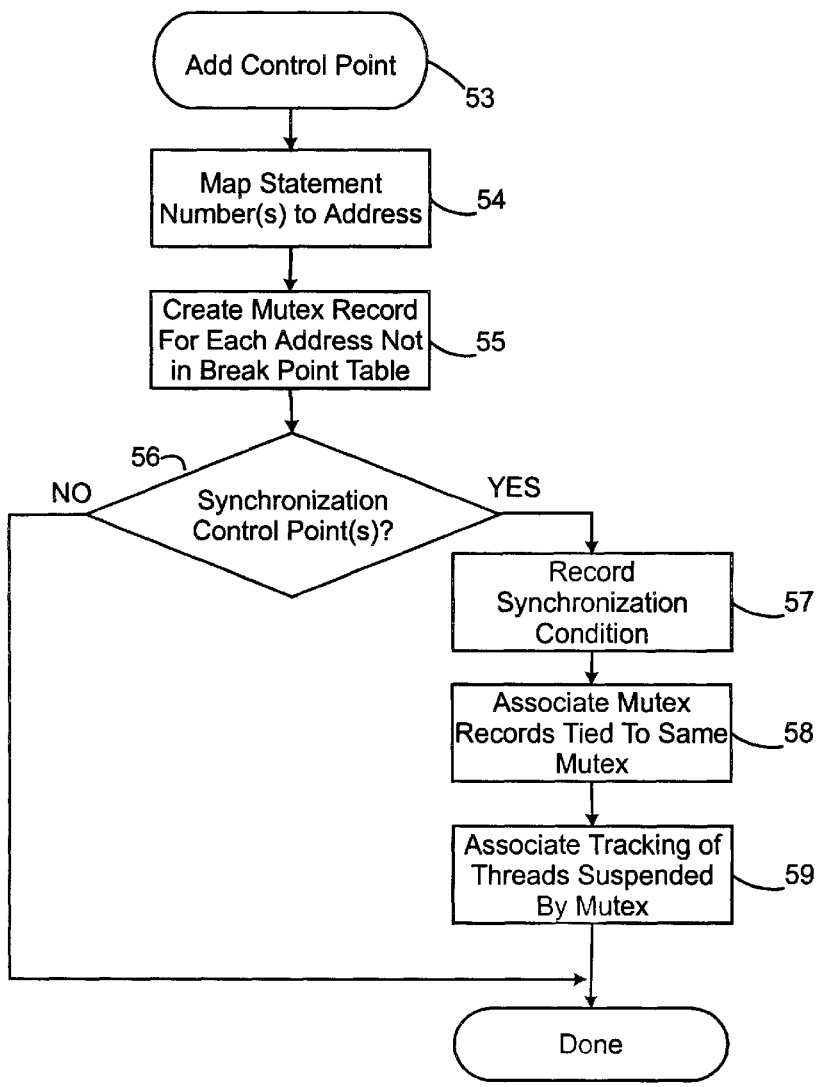
FIG. 3 is a block diagram of a data structure for the break point table of FIGS. 1–2.
FIG. 5 is a flow diagram of an add control point routine referenced in FIG. 4.

Referring to FIG. 3, a data structure for a break point table 32 referenced in FIGS. 1–2 is illustrated. Fields provided for each control point record include an "address" field 32a representing the physical storage location for the instruction. This address field 32a would be referenced when a system exception occurs at a specific address. If the address is in the break point table 32, then the system exception is presumed to have occurred due to the insertion of the control point at this point in the computer program 20. This address may also generally be required to set the mutex handler 19.

Also, provided in the break point table 32 is an "op code" field 32b for storing the original op code or instruction replaced in the computer program 20. A "statement number" field 32c is used in interacting with a user who chooses to reference statement numbers in the source code rather than addresses. A "mutex" field 32d is used to tie together multiple records in the break point table 32 when a plurality of synchronization control points are used. In addition, the mutex field 32d may contain information needed to interact with the mutex handler 19 in controlling the threads. A "sync point" flag 32e is used for alerting the break point manager 30 to treat this control point as a synchronization control point. A "synchronization condition" field 32f is used to specify under what conditions the thread hitting the synchronization control point should be suspended and released. A "threads suspended" field 32g records threads held by the mutex for purposes such as displaying to the user and to test against the condition in field 32f. Finally, a "delay amount" field 32h may be used for scheduling a timer to delay recommencing a thread after the synchronization condition is satisfied. When the timer expires, the break point manager 30 interacts with the mutex handler 19 to clear the mutex.

It should be appreciated that this table is merely for illustration. Some embodiments would provide fewer or more types of control point data. In addition, this information could be contained in one or more data structures of various compositions.

Figure 4:
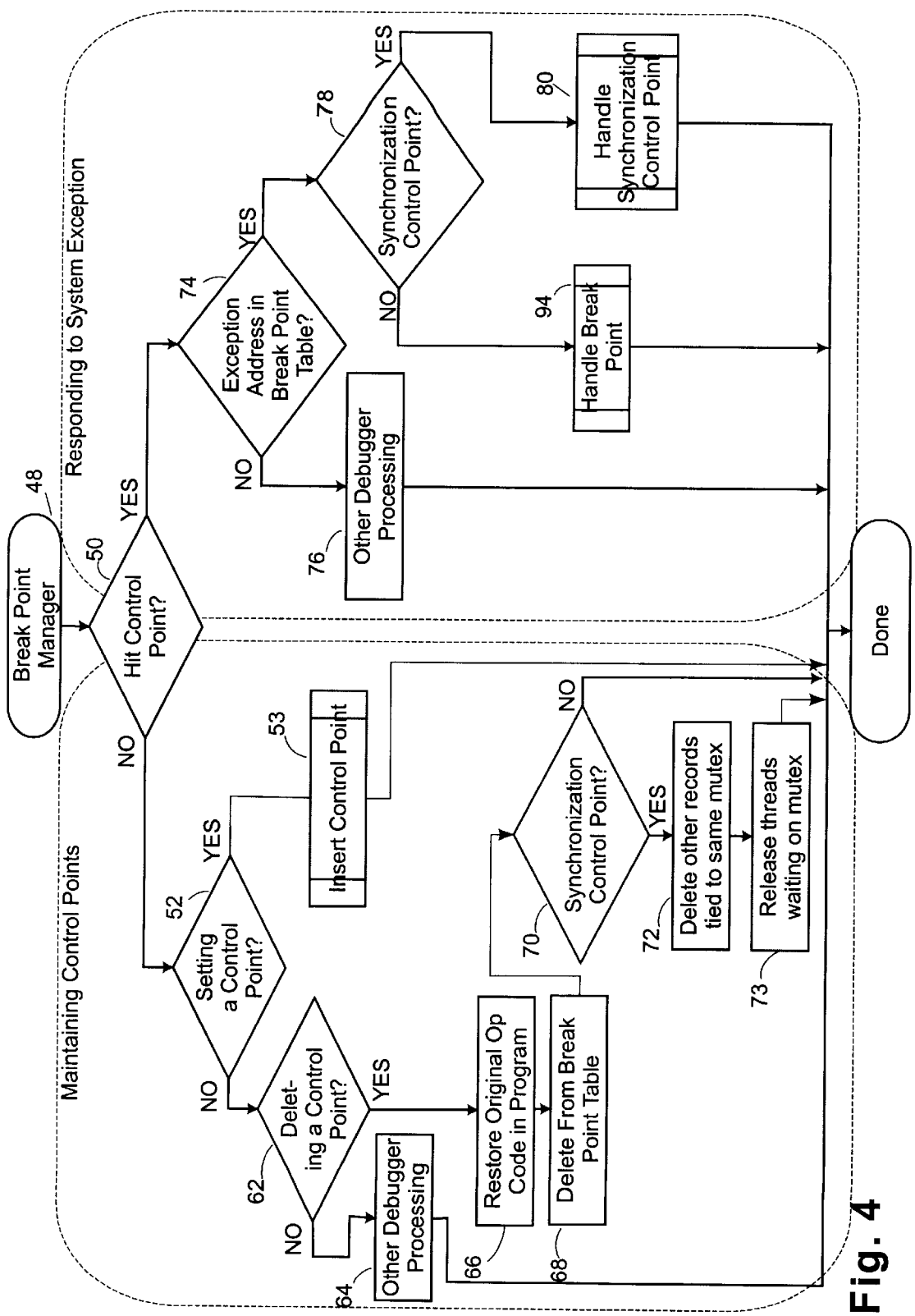
FIG. 4 is a flow diagram of a break point manager routine performed on the computer system of FIG. 1.

Referring to FIG. 4, a break point manager routine 48 is illustrated for maintaining control points and responding to a system exception. First, a determination is made as to whether a control point has been hit during program execution (block 50). If a control point was not hit in block 50, then a determination is made as to whether a debugging command has been made to set a control point (block 52).

In some embodiments, multiple synchronization control points are partnered by having suspension of a first thread at a first synchronization control point conditioned on one or more threads hitting their respective synchronization control points. Consequently, several of the processes show both singular or plural actions depending on whether the synchronization control point has partners.

If a control point is to be set in block 52, an add control point routine 53 is performed, as illustrated in FIG. 5. First, statement numbers are mapped to the actual addresses respectively (block 54). Then a mutex record is created for each address not in the breakpoint table 32 (block 55).

Then, a determination is made as to whether the control point(s) being added are synchronization control point(s), and, if not, routine 53 is done. If, however, in block 56, the control point(s) are synchronization control points, then a synchronization condition is recorded (block 57). Then, each synchronization control point is associated to the same mutex by a cross-reference in their respective mutex records in the breakpoint table 32 (block 58). Then, a tracking of threads suspended by the mutex are associated (block 59). For example, each mutex record could have a pointer to a common storage address. Then routine 53 is done.

Returning to block 52 in FIG. 4, if a control point was not to be set, a determination is made as to whether a debugging command has been made to delete a control point (block 62). If not, then other debugger processing occurs (block 64), and routine 48 is done. Returning to block 62, if routine 48 is to delete a control point, then the original op code stored in the break point table 32 is returned to the computer program 20 (block 66). Then, the record in the break point table 32 is deleted (block 68). If the control point was not a synchronization control point (block 70), then routine 48 is done, else any other records in the break point table 32 for synchronization control points tied by a common mutex are similarly deleted (block 72) and threads waiting on the common mutex are released (block 73). Then, routine 48 is done.

Returning to block 50 for when a control point has been hit, then a determination is made as to whether the system exception is for an address that is in the break point table 32 (block 74). If the address is not in the break point table 32, then other debugger processing may occur (block 76) and then routine 48 is done. If the address for the system exception was found in the break point table 32 in block 74, then a determination is made as to whether a synchronization control point has been hit (block 78), and if so, then the synchronization control point is handled (block 80).

Figure 6:
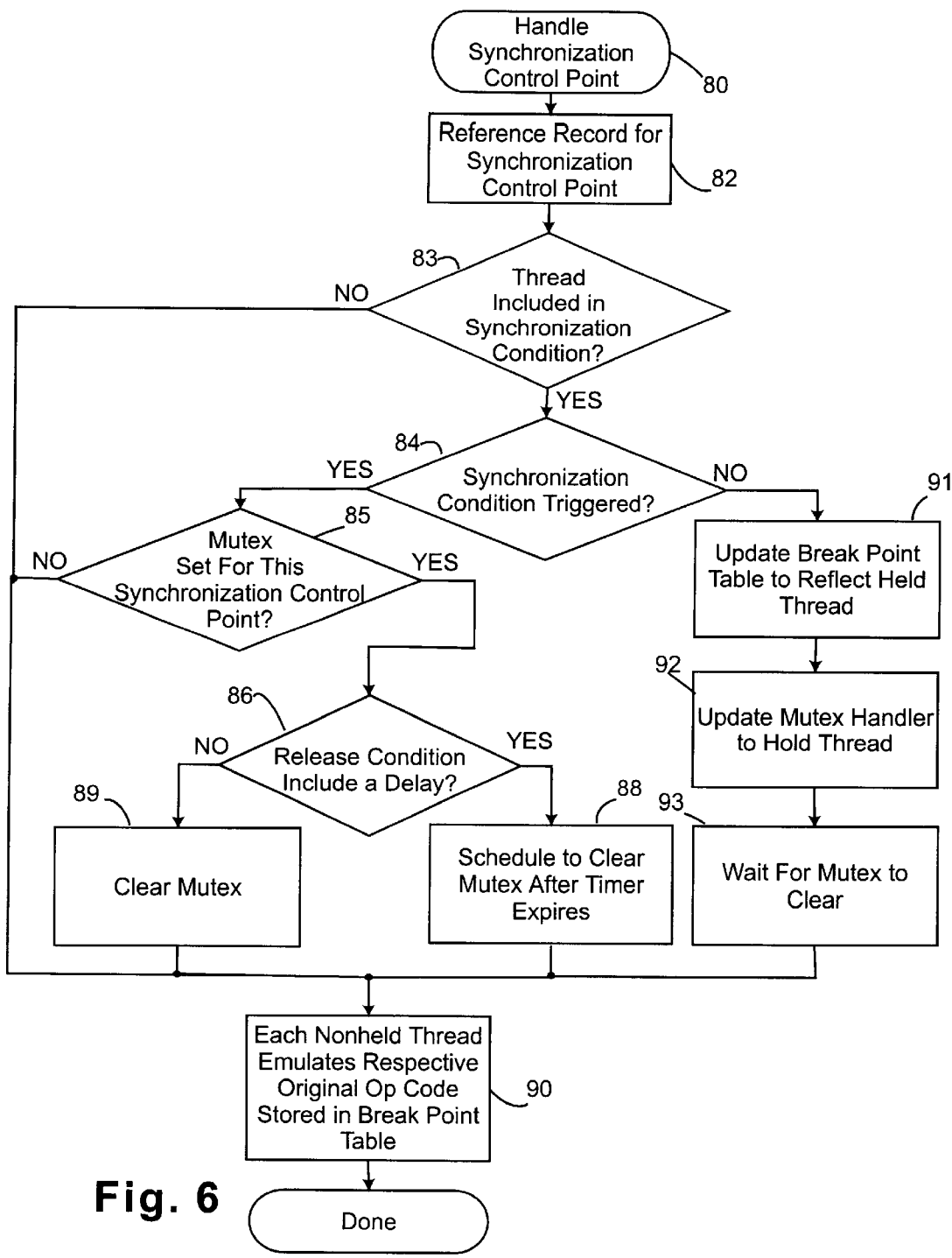
FIG. 6 is a flow diagram of the handle synchronization control point routine referenced in FIG. 4.

Referring to FIG. 6, the handle synchronization control point routine 80, referenced in FIG. 4, is illustrated. The break point table 32 is referenced to find the record for the synchronization control point (block 82). Then a determination is made as to whether the synchronization condition for this control point includes the specific thread that hit the control point (block 83). For example, the synchronization condition may be to hold all threads that hit a synchronization control point until Thread C hits a synchronization control point. Therefore all threads are included in the synchronization condition. Another example, would be to suspend thread A until thread C hits a synchronization control point, for which thread A would be included whereas thread D would not be included. If the thread was not included in the synchronization condition, the thread is intended to be disregarded. Thus, the thread should be unsuspended and other threads waiting for the mutex associated by this control point should continue waiting. Therefore, if the thread is not included within the synchronization condition of block 83, then processing proceeds to block 90 to release the thread by emulating the original op code stored in the break point table 32.

If in block 83 the thread encountering the synchronization control point is included in the synchronization condition, then a determination is made as to whether the synchronization condition is triggered for this synchronization control point (block 84). For example, the synchronization condition required that three threads be suspended behind mutex before releasing, then the third thread to hit the synchronization control point would satisfy the synchronization control point. For another example, if the synchronization condition was to hold all threads until thread C hits a synchronization control point, then thread C would satisfy the condition.

If the synchronization condition is satisfied ("triggered") in block 84, then a determination is made as to whether the mutex associated with this synchronization control point has been previously set by the mutex handler 19 (block 85). If the mutex is not set, the break point manager need only recommence program execution rather than interact with the mutex handler 19. Thus processing goes to block 90 where the thread is released by emulating the original op code stored in the break point table 32 for the synchronization control point, and routine 80 is done.

If at block 85 the mutex is determined to have been set and thus a thread or threads are being suspended by this mutex, then a determination is made whether the mutex made release conditioned on a delay (block 86). If no delay is required, then the threads held at the mutex are released by interacting with the mutex handler 19 (block 89), with the threads allowed to recommence by emulating the original op code field 32*b* stored in the break point table 32 (block 90) and routine 80 is done. If a delay was required in block 86, then routine 80 schedules to clear the mutex after a timer expires (block 88) after which the mutex is cleared allowing all held threads to run and the original op code emulated in block 90.

Returning to block 84, if the synchronization condition was not triggered and thus the thread is to be suspended, then in block 91 the break point table is updated to reflect that the thread is being held. Then, the break point manager routine 48 updates the mutex handler to hold the thread (block 92). Then processing waits for the mutex to clear (block 93) before releasing the thread by emulating the original op code (block 90) and routine 80 is done.

Figure 7:
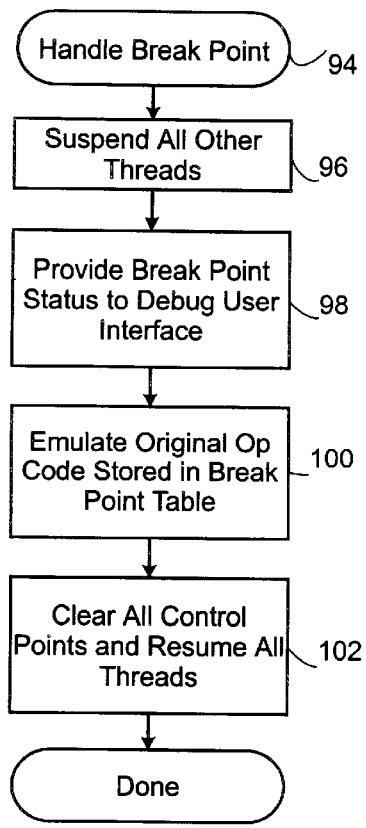
FIG. 7 is a flow diagram of the handle break point routine referenced in FIG. 4.

Referring to FIG. 7, the handle break point routine 94 referenced in FIG. 4 is illustrated. First, all threads are suspended (block 96). A debug hook operation is performed so that user input is possible, such as for display or commands regarding program execution (block 98). Often, a debug hook refers to an interface made to a separate debugger user interface that may be largely platform independent.

Once program execution is commanded, then the thread that hit the control point is recommenced by emulating the original op code stored in the break point table 32 (block 100). In some embodiments, then all control points are cleared in the break point table 32, or otherwise reset, and all threads unsuspended and allowed to resume (block 102). Then routine 94 is done.

Figure 8:
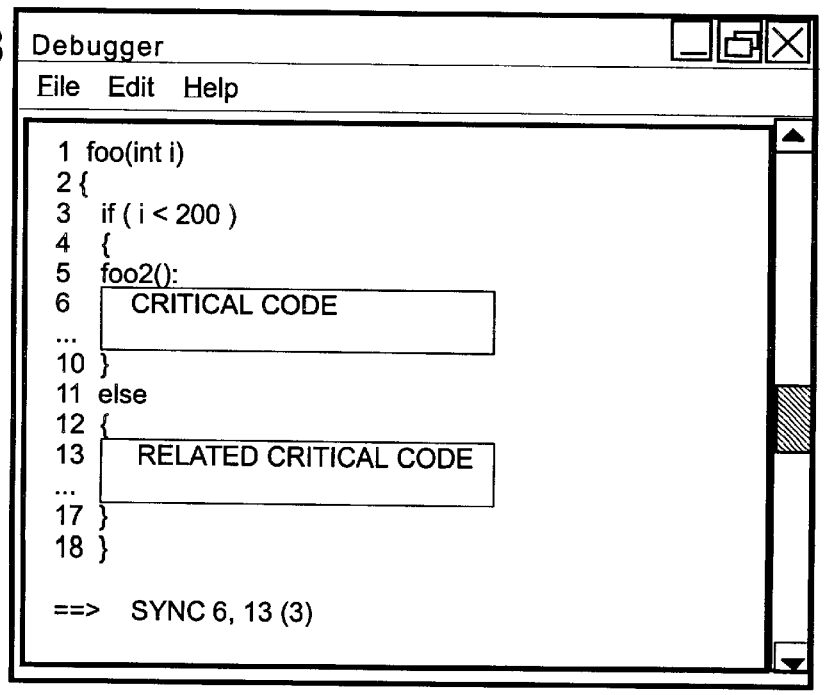
FIG. 8 is a depiction of a graphical user interface displaying a portion of computer program, or code, two sections of which are denoted as critical, for which a command is made to synchronize at lines 6 and 13.

Referring to FIG. 8, a graphical user interface is illustrated showing a portion of computer program having statement numbers 1–18. Lines 6–9 and 13–16 are shown being critical code for which a user would like to synchronize thread execution. To that end, the user has entered a command "sync 6, 13 (3)" meaning that two gated synchronization control points are to be inserted at statement numbers 6 and 13 for which a thread count of 3 is required prior to releasing any threads held at these two points. It should be appreciated that this illustration is exemplary only. Many debugger user interfaces and command schemes could be employed.

Figure 9:
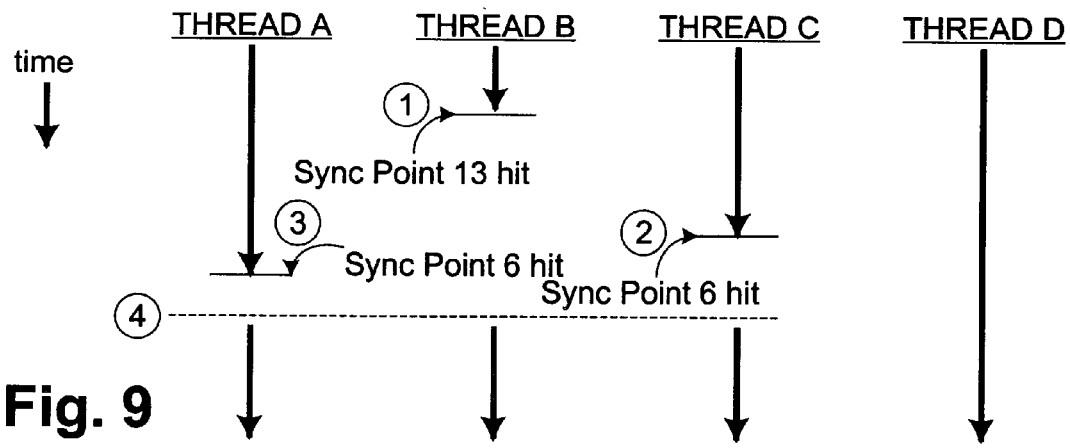
FIG. 9 is an illustrative example of using synchronization control points to synchronize execution of three threads, based on the portion of code of FIG. 8.

Referring to FIG. 9, a depiction is made of four threads A, B, C, D simultaneously executing in accordance with the command of FIG. 8. At time 1, thread B hits the synchronization control point at statement 13 and is suspended since three threads must be suspended before release. Then at time 2, thread C hits the synchronization control point at line 6 and is also suspended. Then at time 3, thread A hits the synchronization control point at statement number 6. The mutex for all three is satisfied since three threads are held, and as a result, all three are synchronized, and may be released for execution under the desired conditions. FIG. 9 shows a short delay before all three recommence for the time required to process the scheduling. Thread D is shown as being unaffected by the synchronization control points.

Figure 10:
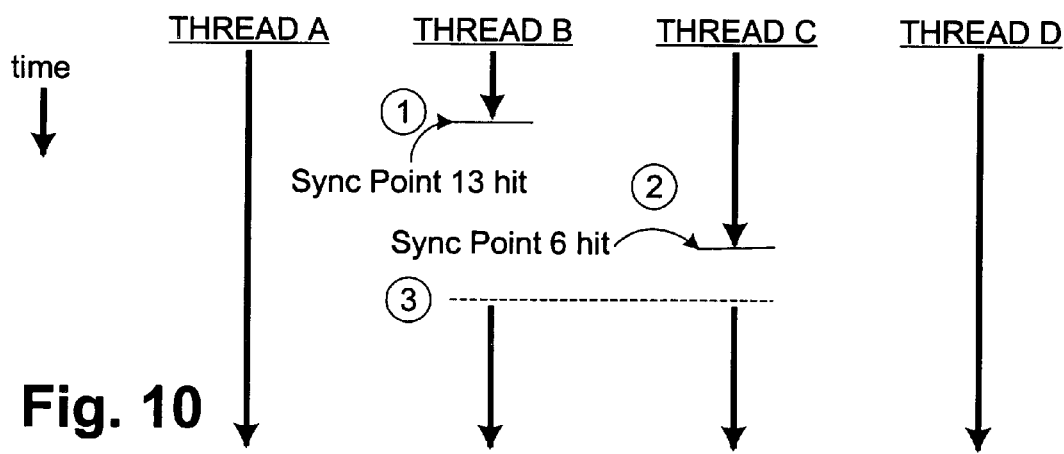
FIG. 10 is an illustrative example of synchronization control points to uniformly delay execution of two threads, based on the portion of code of FIG. 8.

Referring to FIG. 10, another example is shown similar to FIG. 9, except that the condition holding thread B at synchronization control point 13 is that specifically thread C hit synchronization control point 6 and that a delay time be imposed on both thread B and C. Threads A and D are shown as unaffected by the synchronization control points.

In another embodiment, instead of inserting invalid instructions to force a system exception, control points may constitute valid instructions that directly perform the break point manager actions to process the control point. These valid instructions may be inserted into the computer program 20 or be in the form of a "patch," with a branch instruction placed in the program 20.

Other modifications will be apparent to one of ordinary skill in the art. Therefore, the invention lies solely in the claims hereinafter appended.

What is claimed is:

1. A method of synchronizing execution of a multi-thread program on a computer system comprising:
    locating an entry address as a first synchronization control point for a first critical section in the program;
    storing in a break point table an op code and the entry address;
    storing an instruction configured to interrupt program execution at the entry address;
    storing in the break point table a synchronization condition associated with the first synchronization control point;
    executing a portion of the multi-thread program with a debugger, the multi-thread program including a plurality of threads; and
    conditionally suspending execution of a first thread at the first synchronization control point while continuing execution of a second thread pending a predetermined synchronization event.

2. The method of claim 1, wherein continuing execution of the second thread pending the predetermined synchronization event includes detecting the second thread encountering a second synchronization control point associated with the first synchronization control point.

3. The method of claim 2, wherein a delay amount is associated with the first synchronization control point, and wherein suspending execution of the first thread further comprises delaying execution of the first thread by a delay amount after the second thread encounters the second synchronization control point.

4. The method of claim 3, further comprising suspending the second thread by the delay amount.

5. The method of claim 2, further comprising unsuspending the first and second threads after the second thread encounters the second synchronization control point.

6. The method of claim 1, wherein continuing execution of the second thread pending the predetermined synchronization event includes detecting the second thread encountering the first synchronization control point.

7. The method of claim 1, wherein continuing execution of the second thread pending the predetermined synchronization event includes exceeding a synchronization condition for the number of threads suspended at the first synchronization control point.

8. The method of claim 1, further comprising allowing the execution of the first thread by emulating the original op code stored in the break point table.

9. The method of claim 1, wherein conditionally suspending execution of the first thread at the first synchronization control point while continuing execution of the second thread pending the predetermined synchronization event includes setting a mutex associated with the first synchronization control point to suspend the first thread.

10. The method of claim 9, further comprising unsuspending execution of the first thread by clearing the mutex in response to the predetermined synchronization event being satisfied.

11. The method of claim 9, further comprising allowing a third thread to execute after hitting the first synchronization control point, the third thread being excluded from the predetermined synchronization event.

12. An apparatus comprising:
   a memory;
   a first multi-threaded program resident in memory, the first program including a first thread and a second thread; and
   a second program, resident in the memory, the second program configured to locate an entry address as a first synchronization control point for a first critical section in the first program, to store in a break point table an op code and the entry address, to store an instruction configured to interrupt program execution at the entry address, to store in the break point table a synchronization condition associated with the first synchronization control point, to execute a portion of the first program for debugging, and to conditionally suspend execution of the first thread at the first synchronization control point while continuing execution of a second thread pending a predetermined synchronization event.

13. The apparatus of claim 12, further comprising a break point table defining the synchronization control points.

14. The apparatus of claim 12, wherein the second program is configured to continue execution of the second thread pending the predetermined synchronization event responsive to detecting the second thread encountering the first synchronization control point.

15. A program product, comprising:
   a first program configured to execute a portion of a second program for debugging, the second program including a first thread and a second thread, and the first program further configured to locate an entry address as a first synchronization control point for a first critical section in the first program, to store in a break point table an op code and the entry address, to store an instruction configured to interrupt program execution at the entry address, to store in the break point table a synchronization condition associated with the first synchronization control point, and to conditionally suspend execution of the first thread at the first synchronization control point while continuing execution of a second thread pending a predetermined synchronization event; and
   a signal bearing media bearing the program.

16. The program product of claim 15, wherein the signal bearing media includes transmission type media.

17. The program product of claim 15, wherein the signal bearing media includes recordable media.

* * * * *